US007710986B2

(12) United States Patent
Zeng et al.

(10) Patent No.: US 7,710,986 B2
(45) Date of Patent: May 4, 2010

(54) MULTICAST ARCHITECTURE FOR WIRELESS MESH NETWORKS

(75) Inventors: Surong Zeng, Altamonte Springs, FL (US); Heyun Zheng, Altamonte Springs, FL (US)

(73) Assignee: MeshNetworks, Inc., Maitland, FL (US)

( * ) Notice: Subject to any disclaimer, the term of this patent is extended or adjusted under 35 U.S.C. 154(b) by 618 days.

(21) Appl. No.: 11/029,794

(22) Filed: Jan. 5, 2005

(65) Prior Publication Data

US 2006/0146730 A1    Jul. 6, 2006

(51) Int. Cl.
*H04L 12/28* (2006.01)
(52) U.S. Cl. .................... 370/408; 370/312; 370/390; 370/401
(58) Field of Classification Search ................. 370/390, 370/432, 254, 255, 256, 401, 312, 328, 338, 370/352, 353, 354, 400, 408, 420
See application file for complete search history.

(56) References Cited

U.S. PATENT DOCUMENTS

| | | | |
|---|---|---|---|
| 5,812,531 A * | 9/1998 | Cheung et al. | 370/255 |
| 6,577,609 B2 | 6/2003 | Sharony | |
| 6,781,999 B2 * | 8/2004 | Eyuboglu et al. | 370/399 |
| 6,807,165 B2 | 10/2004 | Belcea | |
| 6,873,839 B2 | 3/2005 | Stanforth | |
| 6,963,573 B1 * | 11/2005 | Cain et al. | 370/401 |
| 6,977,938 B2 * | 12/2005 | Alriksson et al. | 370/401 |
| 7,035,937 B2 * | 4/2006 | Haas et al. | 709/239 |
| 7,184,413 B2 * | 2/2007 | Beyer et al. | 370/254 |
| 7,454,518 B1 * | 11/2008 | Cain et al. | 709/238 |
| 2001/0034793 A1 * | 10/2001 | Madruga et al. | 709/238 |
| 2002/0058502 A1 | 5/2002 | Stanforth | |
| 2002/0114302 A1 | 8/2002 | McDonald et al. | |
| 2002/0150098 A1 * | 10/2002 | Sharony | 370/390 |
| 2005/0063409 A1 * | 3/2005 | Oommen | 370/432 |
| 2005/0243824 A1 * | 11/2005 | Abbazia et al. | 370/390 |
| 2006/0101273 A1 * | 5/2006 | Tan et al. | 713/182 |

FOREIGN PATENT DOCUMENTS

DE    112005003332 T5    11/2007

OTHER PUBLICATIONS

P. Gupta, "The Capaity of Wireless Networks," IEEE Transactions on Information Theory, vol. 46, No. 2, Mar. 2000.
M. Miller, W. List & N. Vaidya, "A Hybrid Implementation to Extend Infrastructure Reach," Technical Report, Jan. 2003.
PCT International Search Report And Written Opinion Application No. PCT/US05/47321-Dated Oct. 12, 2006—9 pages.
Korean Patent Office, Notice of Preliminary Rejection (Translated), Jul. 23, 2009, 1 page.
Korean Patent Office, Notice of Preliminary Rejection (Translated), Nov. 28, 2008, 1 page.

* cited by examiner

*Primary Examiner*—Ricky Ngo
*Assistant Examiner*—Wei-Po Kao
(74) *Attorney, Agent, or Firm*—Randi L. Karpinia; Joseph J. Buczynski

(57) ABSTRACT

A multicast architecture and method of operation for multi-hop wireless mesh networks is provided. The multicast architecture is above the network infrastructure to identify a group of clients. These clients share the same application and communicate to each other by using a common multicast address.

16 Claims, 3 Drawing Sheets

MULTICAST ARCHITECTURE FOR WIRELESS MESH NETWORKS

BACKGROUND OF THE INVENTION

1. Field of the Invention:

The present invention relates to a system and method for a multicast architecture for wireless mesh networks.

2. Description of the Related Art:

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

In recent years, a type of mobile communications network known as an "ad-hoc" network has been developed. In this type of network, each mobile node is capable of operating as a base station or router for the other mobile nodes, thus eliminating the need for a fixed infrastructure of base stations.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", issued on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", issued on Oct. 19, 2004, and in U.S. Pat. No. 6,873,839 entitled "Prioritized-Routing for an Ad-Hoc, Peer-to-Peer, Mobile Radio Access System", issued on Mar. 29, 2005, the entire content of each being incorporated herein by reference.

FIG. 1 is a block diagram illustrating an example of an ad-hoc packet-switched wireless communications network 100. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. Nos. 7,072,650, 6,807,165, and 6,873,839, referenced above.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

Multicasting is a more efficient method of supporting group communication than unicasting or broadcasting, as it allows transmission and routing of packets to multiple destinations using fewer network resources. With the advent of widespread deployment of wireless networks, the fast-improving capabilities of mobile devices, and an increasingly sophisticated mobile work force worldwide, content and service providers are increasingly interested in supporting multicast communications over wireless networks. As more and more applications and network control protocols require multicast support, an efficient multicast architecture for wireless multi-hop mesh networks is needed.

Multicast architecture for wired networks has been designed in recent decades. However, no multicast architecture for wireless multi-hop mesh networks has been proposed and deployed. Due to the unique characteristics of wireless multi-hop networks, the multicast architecture for wired networks can not be directly extended to wireless multi-hop networks.

The capacity of pure multi-hop wireless ad hoc networks diminishes as the number of nodes increases in a network as described by P. Gupta and P. R. Kumar in "The Capacity of Wireless Networks", IEEE Transactions on Information Theory, Issue 2, March 2000. In order to increase the capacity of multi-hop wireless ad hoc networks, fixed infrastructure nodes may be introduced into the network, as described by P. Gupta and P. R. Kumar in "The Capacity of Wireless Networks", IEEE Transactions on Information Theory, Issue 2, March 2000, and by M. J. Miller, W. D. List and N. H. Vaidya in "A Hybrid Network Implementation to Extend Infrastructure Reach", Technical Report, January 2003. Large scale multi-hop wireless mesh networks deploy infrastructure nodes such as an Internet Access Point (IAP) to expand the capacity of the mesh networks, and to provide access to the global internet. Multiple IAPs are connected to each other via wired or fixed wireless links through an edge router that is connected to the global internet. In the wireless domain, each routable wireless device can use the multicast routing protocol to join the multicast tree and support the multicast application. However, the multicast routing protocol designed for multi-hop wireless networks can not enable all these devices to join the global internet multicasting architecture.

The proposed multicast architecture enables the mesh networks to join the global multicast groups seamlessly, and extend the multicast support to any routable or non-routable devices in the wireless mesh networks.

SUMMARY OF THE INVENTION

The present invention provides a system and method for enabling mesh networks to join the global multicast group seamlessly, and extend the multicast support to any routable or non-routable devices in the wireless mesh networks. The proposed multicast architecture for the multi-hop wireless mesh networks addresses a very important but never discussed and studied problem for wireless mesh network to efficiently support multicast applications. The proposed multicast architecture for the multi-hop wireless mesh networks enables the mesh networks to join the global multicast group seamlessly, and extend the multicast support to any routable or non-routable devices in the wireless mesh networks.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

In the proposed architecture, the IAP is deployed as the proxy device for all the wireless devices that are using this IAP to access the global internet. These wireless devices are referred to as being associated with the IAP. The IAP runs the group management protocol with an internet edge router to register the multicast groups for the devices associated with it. When a device is interested in a multicast group, it notifies its associated IAP about the multicast group address. The IAP will run the network group management protocol to register the multicast group to the internet edge router, which in turn can join the global internet multicast group by running the wired multicast routing protocol. At the same time, within the wireless mesh network domain, each device runs the wireless multicast routing protocol to form a multicast tree among the multicast group members including the IAP as the multicast group forwarding node. Hence, the wireless multicast routing domain can be connected to the global internet multicast routing domain to enable efficient multicast traffic delivery anywhere.

This architecture can be further extended in the wireless domain to provide multicast supporting capability for wireless devices that are not routable devices. "Routable" means that the device is running routing protocols including unicast and multicast routing protocols; "non-routable" means that the device is not running any routing protocols. For a non-routable device, in order to join the multi-hop wireless mesh network, it has to be proxied by a routable device in the wireless mesh network. In the proposed architecture, the network group management protocol is run between the non-routable device and the routable device. Therefore, the multicast group that the non-routable device is interested in can be registered in the routable device. The routable device can represent the non-routable device to join the multicast group communication via the wireless multicast routing protocol, and forward the multicast traffic to and from the network for the non-routable device. The wireless multicast routing protocol forms a multicast tree among the multicast routable devices (which are multicast group members or proxying for non-routable multicast group members) including the IAP as the multicast group forwarding node. The IAP is informed by the multicast routable devices about the multicast group that the device is interested in. Therefore, the IAP runs the network group management protocol to register the multicast group to the internet edge router, which in turn can join the global internet multicast group by running the wired multicast routing protocol.

Figure 1:
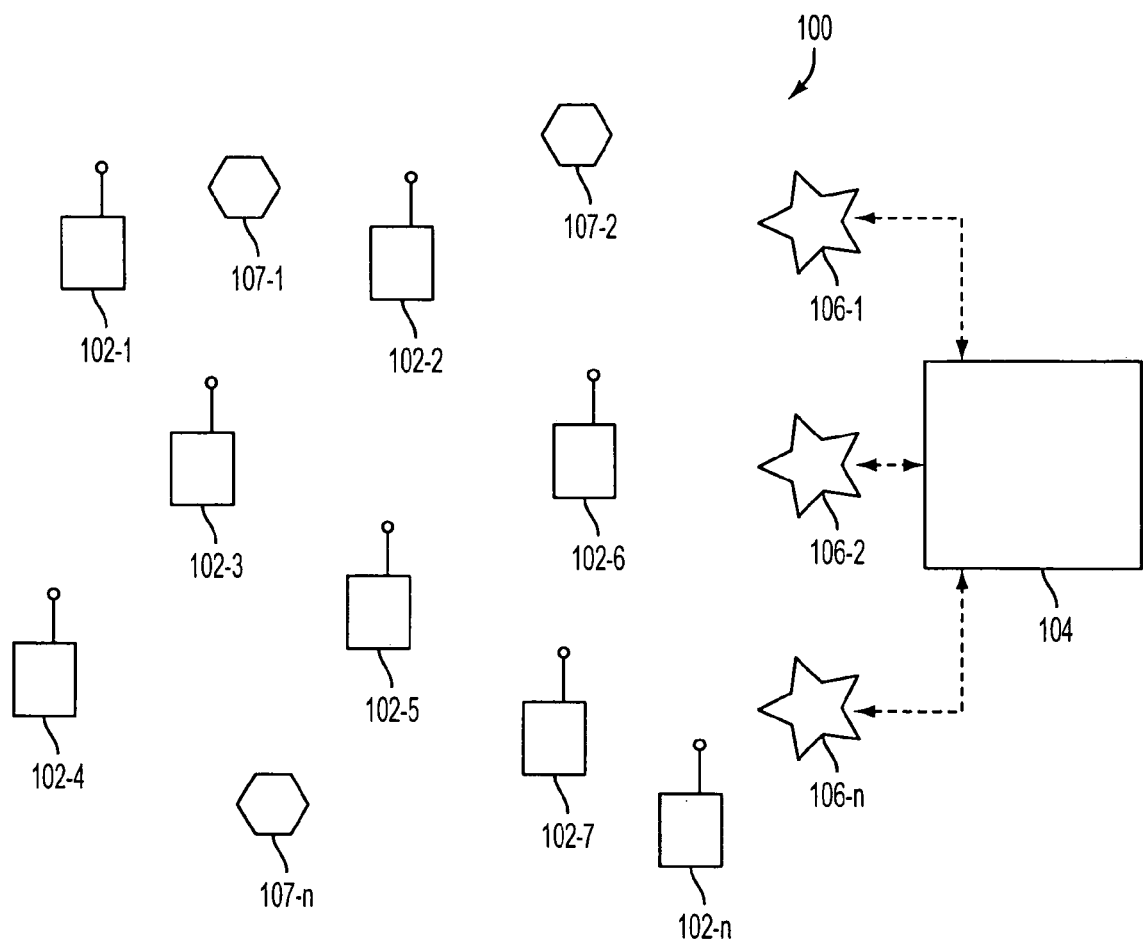
FIG. 1 is a block diagram of an example ad-hoc wireless communications network.
Figure 2:
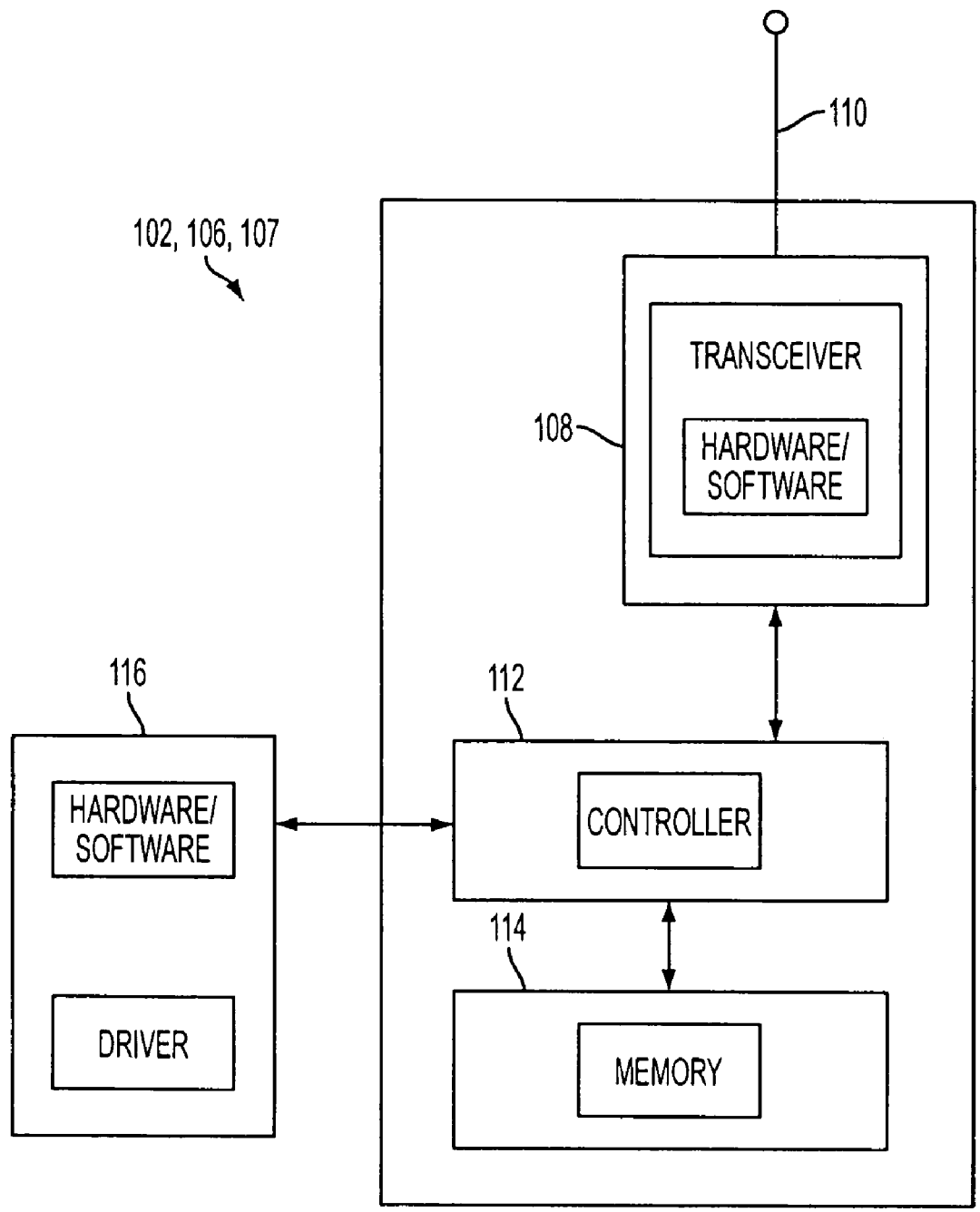
FIG. 2 is a block diagram illustrating an example of a mobile node employed in a network.
Figure 3:
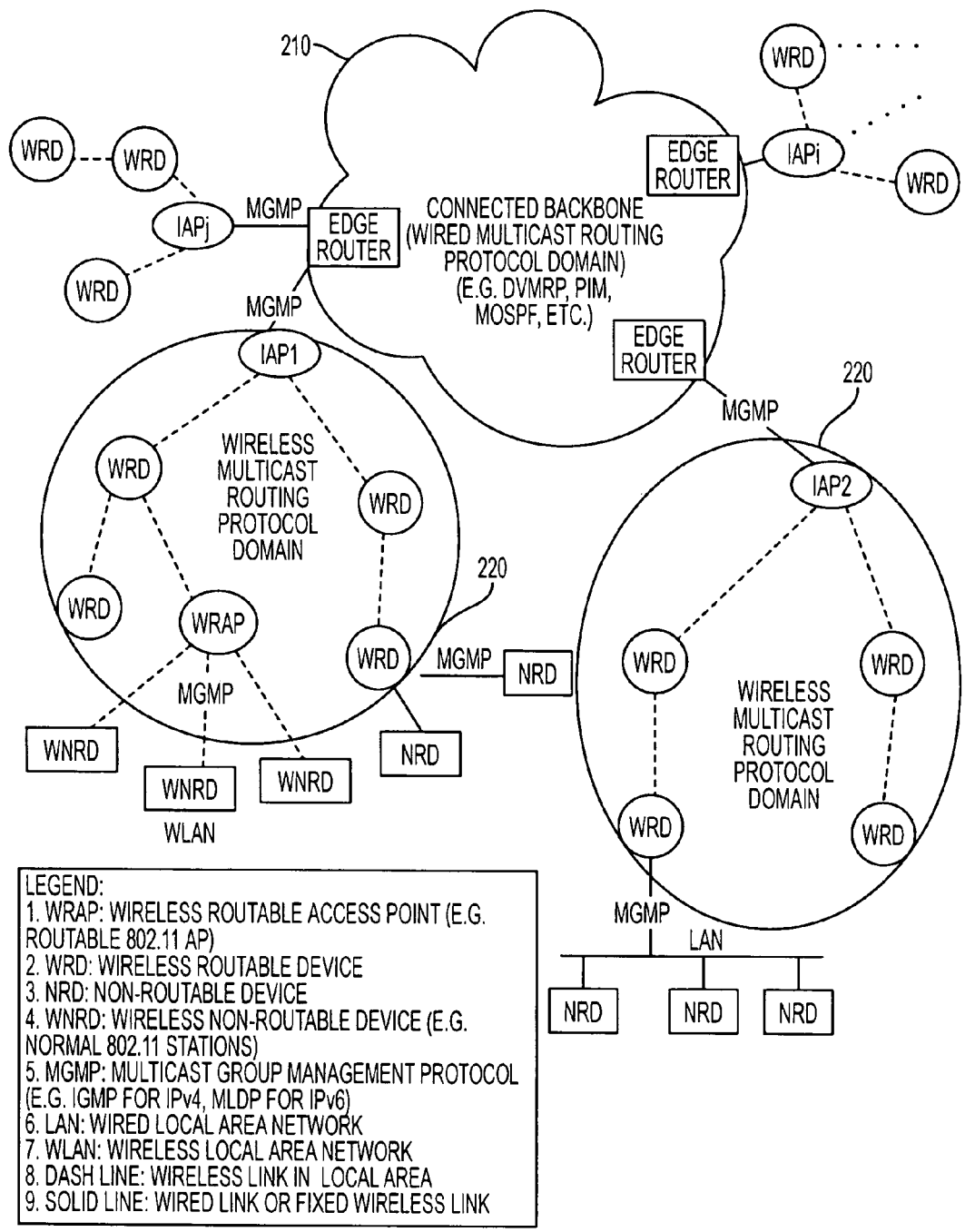
FIG. 3 is a block diagram illustrating an example of a multicast architecture for multi-hop wireless mesh networks according to the present invention.

An example of the multicast architecture for multi-hop wireless mesh networks is shown in FIG. 3. The wireless routable device WRD can be any wireless device with multicast routing engine. It can be routable 802.11 AP, routable 802.15 AP, routable 802.16 base station, etc. The non-routable device can be any wireless non-routable device WNRD or wired non-routable device NRD, such as 802.3/Ethernet client (workstation, personal computer, digital camera, etc.), 802.11 client station, 802.15 device, etc. The multicast group management protocol MGMP can be any group management protocol, such as Internet Group Management Protocol (IGMP) for IPv4, Multicast Listener Discovery Protocol (MLDP) for IPv6, etc. The wireless multicast domain 220 can run any wireless multicast routing protocol to form the multicast tree supporting efficient multicast traffic delivery. The wired multicast domain 210 can run any wired multicast routing protocol, such as Distance Vector Multicast Routing Protocol (DVMRP), Multicast Open Shortest Path First (MOSPF), Protocol Independent Multicast (PIM), etc. to efficiently deliver multicast traffic in the global internet.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for supporting multicast communication in a communication network, the method comprising:

forming a multicast group comprising a plurality of client devices, wherein the client devices comprise one or more mesh network devices operating in a wireless mesh network domain and one or more non-routable devices proxied by at least one mesh network device, arranged in a multi-hop multicast tree, and communicating using a wireless multicast routing protocol, wherein the wireless multicast group includes an internet access point (IAP);

communicating with the internet access point by at least one remotely located client device via one or more mesh network devices along the multi-hop multicast tree within the multicast group;

operating the internet access point as a multicast group forwarding node for the plurality of client devices of the multicast group;

running a group management protocol between the internet access point and an internet edge router to register the plurality of client devices of the multicast group with the internet edge router; and running a wired multicast routing protocol to join the internet edge router to a global internet multicast group, thereby providing access to the global internet multicast group to the plurality of client devices of the multicast group.

2. The method of claim 1, further comprising: notifying the internet access point of a multicast group address for the multicast group by one of the plurality of client devices; and using the multicast group address in registering the multicast group with the internet edge router.

3. The method of claim 1, wherein the at least one remotely located client device comprises a non-routable device, and wherein at least one of the one or more mesh network devices comprise a routable device, the method further comprising:

running a network group management protocol between the non-routable device and the routable device.

4. The method of claim 3, further comprising:

registering a multicast group address for the non-routable device in the routable device.

5. The method of claim 3, wherein the routable device represents the non-routable device in order to allow the non-routable device to join the multicast group, the method further comprising:

registering the multicast group address for the non-routable device with the internet access point.

6. The method of claim 3, wherein the routable device forwards multicast traffic to and from the communication network for the non-routable device.

7. A communications network, comprising:

a plurality of client devices forming a multicast group, wherein the client devices comprise one or more mesh network devices operating in a wireless mesh network domain and one or more non-routable devices proxied by at least one mesh network device, wherein the client devices are arranged in a multi-hop multicast tree and communicate using a wireless multicast routing protocol, wherein the plurality of client devices includes:

at least one remotely located client device;

at least one internet access point, operating within the multicast group as a multicast group forwarding node for the plurality of client devices of the multicast group, wherein the at least one remotely located client device communicates with the internet access point via one or more mesh network devices along the multi-hop multicast tree within the multicast group; and at least one internet edge router, wherein the internet access point runs a group management protocol with the internet edge router to register the plurality of client devices of the multicast group with the internet edge router, and wherein the internet edge router runs a wired multicast routing protocol to join the internet edge router to a global internet multicast group, thereby providing access to the global internet multicast group to the plurality of client devices of the multicast group.

8. The network of claim 7, wherein the at least one remotely located network device comprises a non-routable device, and wherein at least one of the one or more mesh network devices comprises a wireless routable device.

9. The network of claim 8, wherein a network group management protocol is run between the wireless routable device and the non-routable device.

10. The network of claim 9, wherein the non-routable device is a wired device.

11. The network of claim 9, wherein the non-routable device is a wireless device.

12. The network of claim 9, wherein a multicast group address for the non-routable device is registered in the wireless routable device.

13. The network of claim 9, wherein the wireless routable device represents the non-routable device in order to allow the non-routable device to join the multicast group, and further wherein the wireless routable device registers the multicast group address for the non-routable device with the internet access point.

14. The network of claim 9, wherein the wireless routable device forwards multicast traffic to and from the network for the non-routable device.

15. The network of claim 7, wherein at least one of the mesh network devices is a wireless routable access point.

16. The network of claim 7, wherein one of the plurality of mesh network devices notifies the internet access point of a multicast group address for the multicast group, and further wherein the internet access point uses the multicast group address in registering the multicast group with the internet edge router.

* * * * *